United States Patent [19]

Satterwhite

[11] 4,329,087
[45] * May 11, 1982

[54] EXCAVATING AND PIPELINE INSTALLATION SYSTEM

[75] Inventor: Charles R. Satterwhite, Dallas, Tex.

[73] Assignee: Unit Rig & Equipment Co., Tulsa, Okla.

[ * ] Notice: The portion of the term of this patent subsequent to Sep. 26, 1995, has been disclaimed.

[21] Appl. No.: 17,496

[22] Filed: Mar. 5, 1979

Related U.S. Application Data

[60] Continuation of Ser. No. 909,002, May 24, 1978, Pat. No. 4,232,982, which is a division of Ser. No. 683,970, May 6, 1976, Pat. No. 4,116,014.

[51] Int. Cl.$^3$ .............................. E02F 5/10; F16L 1/02
[52] U.S. Cl. ....................................... 405/179; 37/94; 37/96
[58] Field of Search ............... 405/154, 161, 164, 174, 405/177, 179, 180, 181, 183; 37/91, 94, 95, 96

[56] References Cited

U.S. PATENT DOCUMENTS

| | | | |
|---|---|---|---|
| 1,462,488 | 7/1923 | George | 37/94 |
| 1,470,028 | 10/1923 | Parker | 37/96 |
| 2,969,601 | 1/1961 | McMaster | 37/94 |
| 3,332,249 | 7/1967 | Idoine | 405/179 |
| 3,429,132 | 2/1969 | Martin | 405/161 |
| 3,583,168 | 6/1971 | Horton | 405/179 |
| 3,852,972 | 12/1974 | Holberg | 405/161 |
| 3,952,532 | 4/1976 | Spearman | 405/164 |
| 3,974,580 | 8/1976 | Satterwhite | 37/95 X |
| 4,087,981 | 5/1978 | Norman | 405/161 |

FOREIGN PATENT DOCUMENTS

407103 2/1910 France ................................. 37/94

Primary Examiner—David H. Corbin
Attorney, Agent, or Firm—William S. Dorman

[57] ABSTRACT

An excavating and pipeline installation system includes an excavating vehicle, an excavating wheel assembly and a plurality of conveyors. The excavating wheel assembly includes a pair of excavating wheels for excavating a pipeline receiving trench at a predetermined location beneath the surface of the earth. The excavating wheel assembly is supported at the front end of the vehicle on a subframe mounted for pivotal movement relative to the vehicle between excavating and traveling positions. The excavating wheels are mounted for rotation about angularly disposed axes and are positioned to receive the pipeline therebetween. Bolster rollers are mounted on the excavating wheel assembly for initially lifting the pipeline, and pipeline rollers are mounted on the vehicle for exerting a downwardly directed force on the pipeline upon insertion thereof into the pipeline receiving trench. The conveyors include a main conveyor mounted on the subframe for receiving material from the excavating wheels and for transporting the excavated material upwardly and rearwardly. A plurality of trailers are adapted for connection to the rear of the vehicle, and each trailer includes a conveyor for receiving the excavated material and for transporting the excavated material rearwardly. The excavated material is ultimately redeposited in the pipeline receiving trench subsequent to the positioning of the pipeline therein.

14 Claims, 20 Drawing Figures

| PIPE DIA. | h' | L' |
|---|---|---|
| D=48" | 0 | 282.7 |
| | 2 | 220.2 |
| | 4 | 207.9 |
| | 6 | 202.6 |
| D=36" | 0 | 244.8 |
| | 2 | 190.6 |
| | 4 | 180.0 |
| | 6 | 175.4 |
| D=24" | 0 | 199.8 |
| | 2 | 155.5 |
| | 4 | 146.8 |
| | 6 | 143.0 |

FIG. 20

EXCAVATING AND PIPELINE INSTALLATION SYSTEM

This is a continuation of application Ser. No. 909,002 filed May 24, 1978, now Pat. No. 4,232,982 which is in turn a division of application Ser. No. 683,970, filed May 6, 1976, now U.S. Pat. No. 4,116,014 granted Sept. 26, 1978.

BACKGROUND AND SUMMARY OF THE INVENTION

This invention relates to an excavating and pipeline installation system, and more particularly to an excavating and pipeline installation system which continuously excavates a pipeline trench, inserts the pipeline therein, and refills the pipeline trench.

Typically, the installation of a pipeline beneath the surface of the earth involves a multi-step process, requiring several machines, a number of operators and a considerable amount of time. The pipeline sections are first laid out over the surface and are interconnected to form a pipeline string. A pipeline receiving trench is then dug using any of various machines. The excavated material is piled along one side of the trench, thereby increasing the total right-of-way space needed to install the pipe. Using a crane or other lifting devices the pipeline string is then lifted from its assembly location into the pipeline receiving trench. The pipeline trench is then refilled with the excavated material using a bulldozer or the like to push the material back into the trench after which the excavating site is graded. The process thus involves handling the pipe and excavated material several times during the installation of the pipeline.

The present invention comprises a novel excavating and pipeline installation system which overcomes the disadvantages that have characterized the prior art. Thus, the preferred embodiment of the invention comprises a system capable of continuously excavating a pipeline receiving trench, continously positioning the pipeline within the excavated trench and continously redepositing the excavated material into the trench. The system thereby requires a minimum right-of-way for installation of a pipeline and is capable of installing the pipeline in a relatively short period of time.

In accordance with the broader aspects of the invention, an excavating and pipeline installation system comprises a vehicle, and an excavating wheel assembly for excavating a pipeline receiving trench at a predetermined location beneath the surface of the earth. The excavating wheel assembly is connected to the front end of the vehicle for engagement with the material to be excavated. Structure is provided on the vehicle for positioning the pipeline directly above the predetermined location and for positioning the pipeline within the pipeline receiving trench. A main conveyor is mounted on the vehicle for transporting the excavated material rearwardly and upwardly from the excavating wheel assembly to the rear of the vehicle. The system further includes a plurality if detachable trailers for connection to the rear of the vehicle. Each trailer includes a conveyor for receiving the excavated material from the main conveyor and for transporting the excavated material to the rear of the vehicle and to the rear of the trailers, whereby the excavated material is ultimately redeposited into the pipeline receiving trench.

In accordance with the more specific aspects of the invention, the vehicle comprises a main frame which is supported by a plurality of tired wheels at the rear end of the frame and a plurality of track-type wheels at the front end of the frame. A subframe is mounted on the main frame for pivotal movement about the axis of the tired wheels, and the excavating wheel assembly is rotatably supported on the subframe. The subframe also supports the main conveyor for receiving excavated material from the excavating wheel assembly and for transporting the excavated material to the rear of the vehicle. Bolster rollers are mounted on the supporting structure for initially lifting the pipeline, the pipe rollers are mounted on the main frame for exerting a downwardly directed force on the pipeline in order to insert the pipeline into the receiving trench. The plurality of detachable trailers are supported by a plurality of tired wheels located centrally between the front and rear end of the trailer. The location of the plurality of wheels permits the plurality of trailers to move around a curved path.

DESCRIPTION OF THE DRAWINGS

A more complete understanding of the invention may be had by referring to the following Detailed Description when taken in conjunction with the accompanying Drawings, wherein:

FIG. 18 is a diagrammatic illustration, FIG. 19 is a graph.

DETAILED DESCRIPTION

Figures 1, 2:
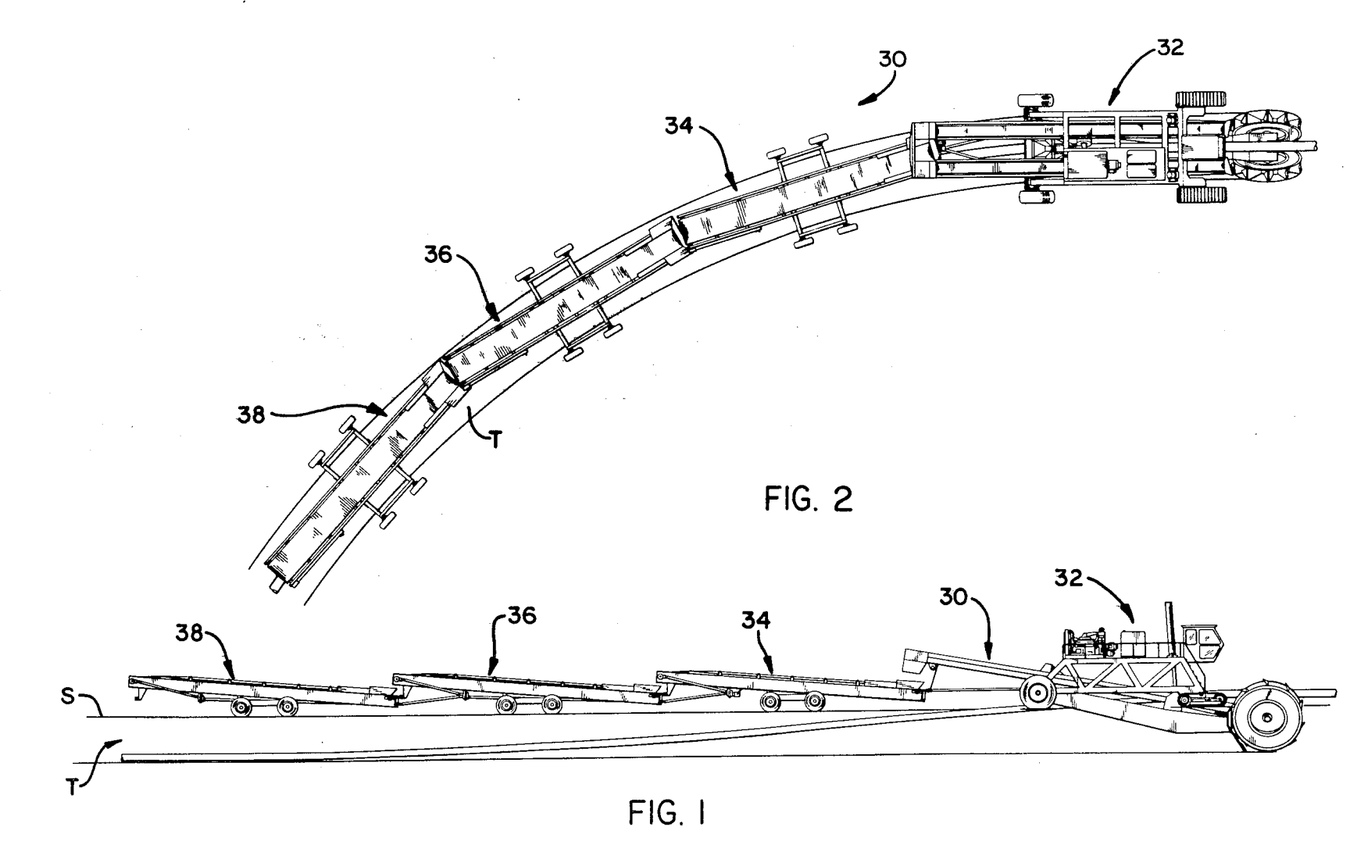
FIG. 1 is a side elevation view of the excavating and pipeline installation system comprising the preferred embodiment of the present invention.
FIG. 2 is a top plan view of the preferred embodiment of the present invention.
Figure 3:
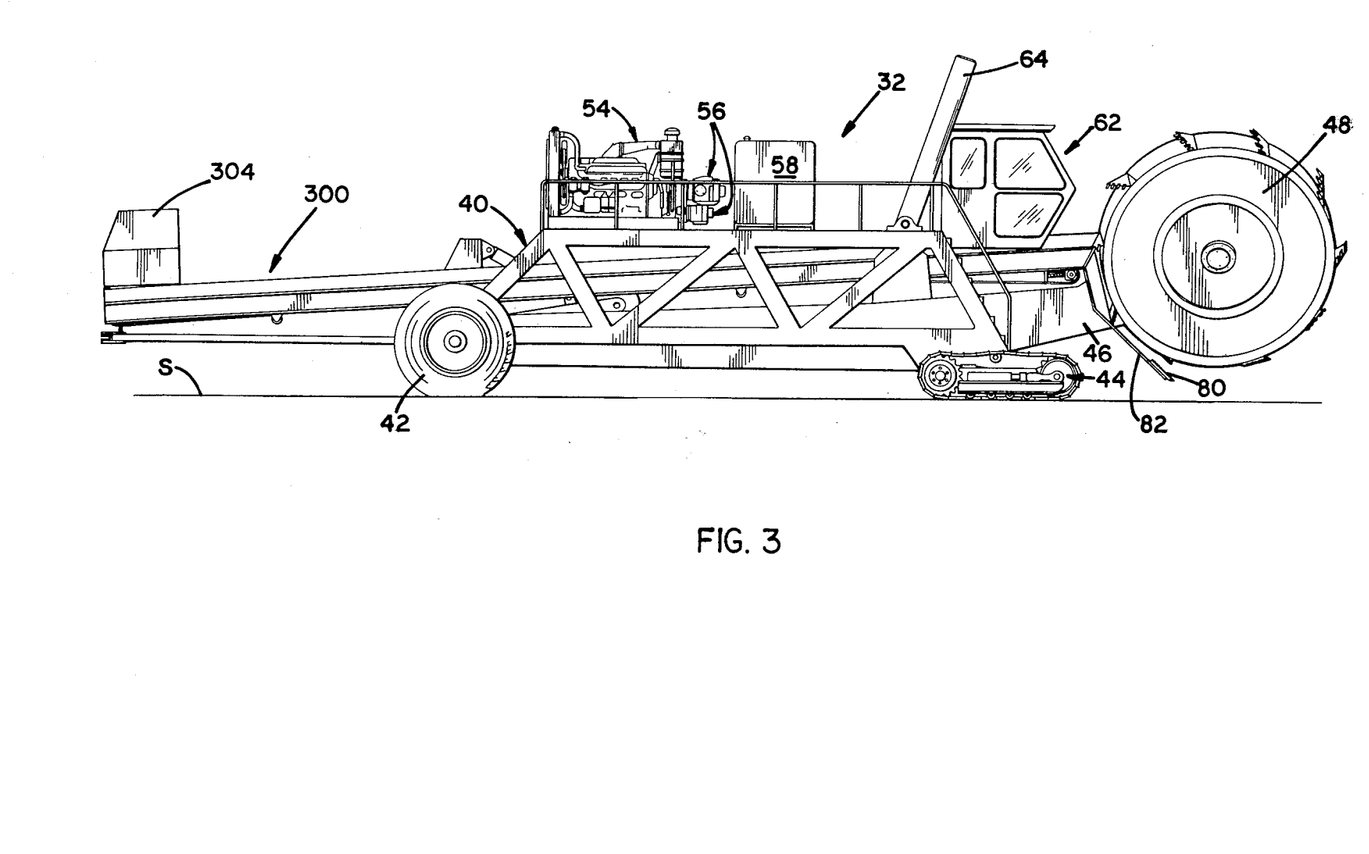
FIGS. 3 and 4 are enlarged side elevation views of the excavating machine of the present invention.

Referring now to the Drawings, and particularly to FIGS. 1 and 2 thereof, there is shown a pipeline installation system 30 incorporating the present invention. The pipeline installation system 30 includes an excavating machine 32 and a plurality of trailers 34, 36, 38, etc. As will become more apparent hereinafter, the number of trailers that are employed in the pipeline installation system 30 depends on a number of variables, including the diameter of the pipe to be installed.

Referring simultaneously to FIGS. 1 and 3-6, the excavating machine 32 of the pipeline installation system 30 includes a main frame 40 supported for movement over a surface S, and above a pipeline receiving trench T. The rear of the main frame 40 is supported on a pair of tired wheels 42, and the front of the main frame 40 is supported on a pair of tracktype wheels 44. These particular types of wheels are representative only, and other types of wheels may be utilized in supporting the main frame 40 of the excavating machine 32 for movement over the surface S.

The excavating machine 32 further includes an excavating wheel frame 46. The excavating wheel frame 46 is mounted for pivotal movement about a horizontal axis which is coincident with the axis of rotation of the tired wheels 42. Alternatively, the excavating wheel frame 46 may be pivotally mounted at any position along the main frame 40. The pivotal positioning of the wheel frame 46 and the component parts carried thereby relative to the main frame 40 permits the wheel frame 46 to be manipulated between the machine travel position illustrated in FIG. 3 and the machine work position illustrated in FIG. 4.

Figure 6:
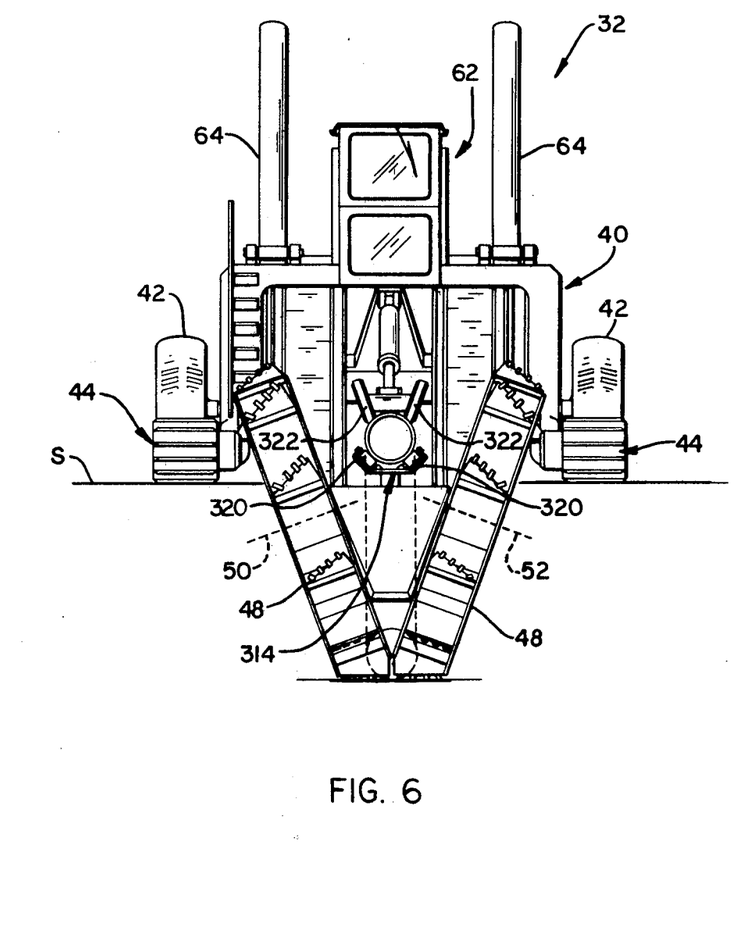
FIG. 6 is a front elevation view of the excavating machine of the present invention.

Supported at the distal end of the wheel frame 46 are a pair of excavating wheels 48. As shown in FIG. 6, the excavating wheels 48 are mounted for rotation about angularly disposed axes 50 and 52. The construction of the excavating wheels 48 will be subsequently described in connection with FIGS. 7-9.

Referring again to FIGS. 3-6, an engine 54 is mounted on the main frame 40 of the excavating machine 32 and functions to supply operating power for all of the various components comprised in the pipeline installation system 30. The engine 54 preferably comprises a diesel engine, but may also comprise a carburetion-ignition engine, if desired. Alternatively, the engine 54 may comprise an electric motor.

The engine 54 drives a plurality of hydraulic pumps 56, which in turn function to supply operating power for the various components of the pipeline installation system 30. The engine 54 also drives one or more electrical generators which supply electric power for various components of the system 30.

A pair of tanks 58 and 60 are mounted on the main frame 40 of the excavating machine 32. The tank 58 comprises a fuel tank for the engine 54, and the tank 60 comprises a hydraulic fluid reservoir. Additional liquid storage tanks may also be provided for the storage of lubricating fluid, water, and the like. Also mounted on the main frame 40 of the excavating machine 32 is an operator's compartment 62, which houses controls for the operation of the system 30. A pair of hydraulic cylinders 64 are also mounted on the main frame 40 for controlling the pivotal positioning of the wheel frame 46 relative to the main frame 40.

The pipeline installation system 30 is propelled by means of the track-type wheels 44. As is most clearly shown in FIG. 5, each of the track-type wheels 44 is provided with a hydraulic motor 66. The hydraulic motor 66 has an output which drives a planetary speed reducer 68. The speed reducer 68 drives an output sprocket 70 which is mounted in mesh with the crawler track 72 of the track-type wheels 44. In this manner, the two hydraulic motors 66 function as component parts of a hydrostatic drive system to propel the entire pipeline installation system 30.

Figure 5:
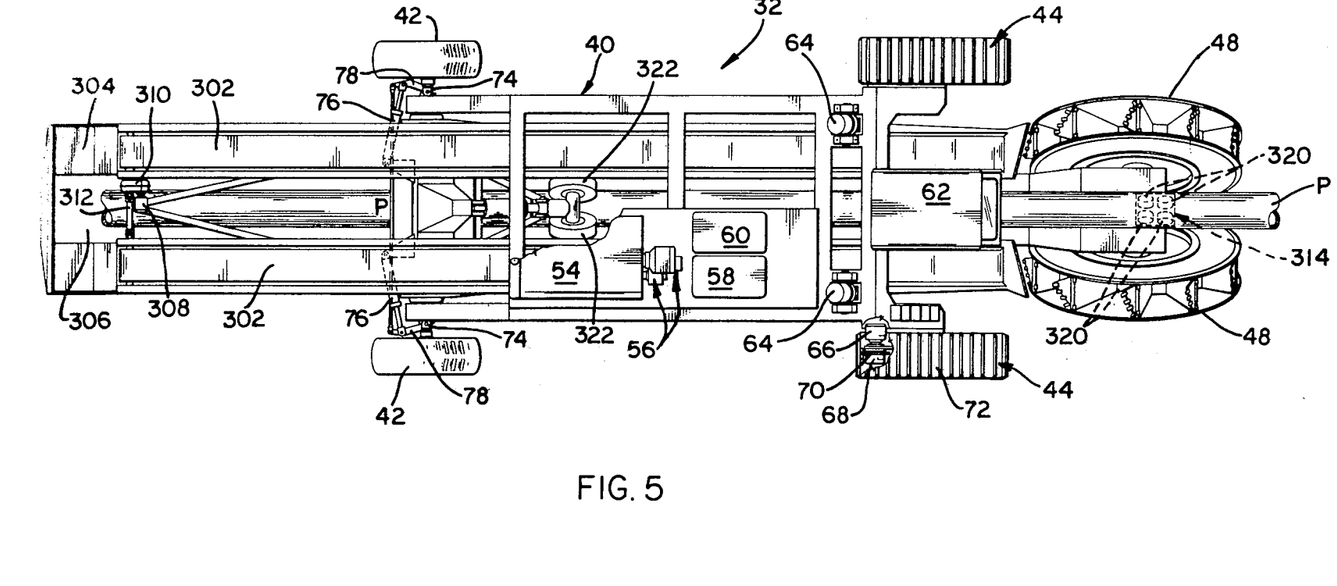
FIG. 5 is a top plan view of the excavating machine of the present invention.

Referring to FIG. 5, the tired wheels 42, which support the rear of the main frame 40 of the excavating machine 32, are supported on king pins 74 for pivotal movement about vertical axes. Pivotal movement of the wheels 42 is controlled by hydraulic cylinders 76, which are connected between the main frame 40 and bell cranks 78 secured to the wheels 42. Steering of the excavating machine 32 may also be effected utilizing the track-type wheels 44, such as by actuating one of the hydraulic motors 66 to cause its associated crawler track 72 to move in a first direction while the other hydraulic motor 66 is operated to cause its associated crawler track 72 to operate in the reverse direction. Alternatively, a differential speed may be applied to the track-type wheels 44 to steer the excavating machine 32. Other means of utilizing track-type wheels to effect steering are well known in the art.

A crumbling blade 80 is supported at the front end of the excavating machine 32 of the system 30, beneath the excavating wheels 48. The blade 80 is connected to the wheel frame 46 by supporting structure 82, and functions to push forward any excavated material which has fallen into the trench.

Figure 7:
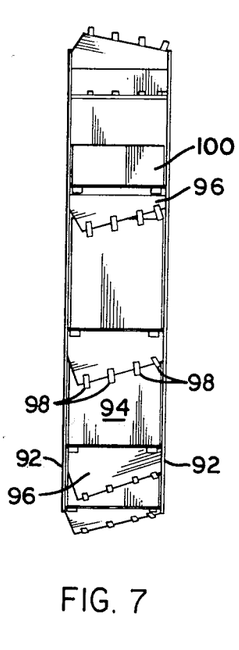
FIG. 7 is a top plan view of an excavating wheel of the present invention.
Figure 8:
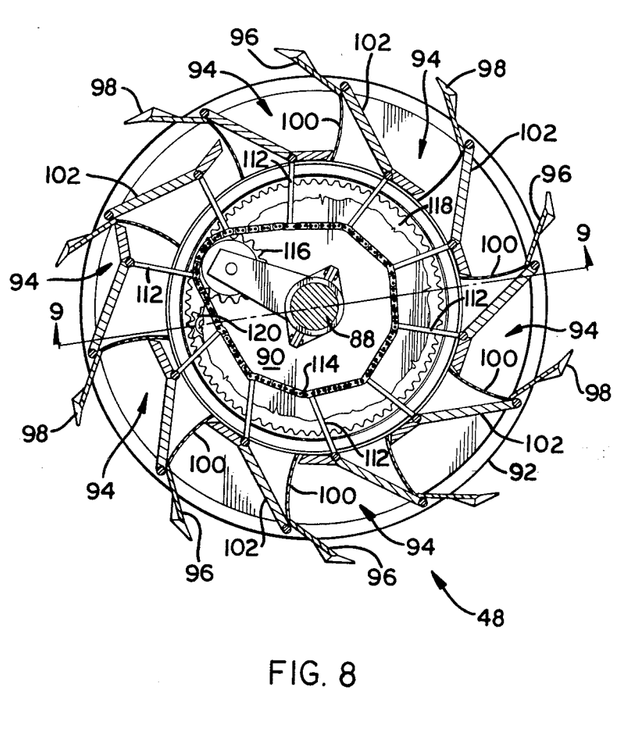
FIG. 8 is a side elevation view partly in section of the excavating wheel of the present invention.
Figure 9:
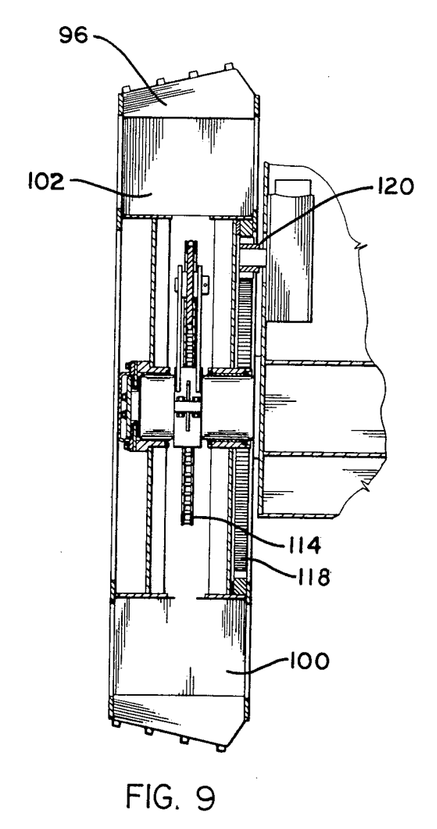
FIG. 9 is a sectional view taken generally along the sectional lines 9—9 of the excavating wheel of the present invention in FIG. 8.

Referring simultaneously to FIGS. 7, 8 and 9, the excavating wheels 48 are shown. Each excavating wheel 48 is supported by a shaft 88, and includes a hub 90 and a pair of rims 92, which extend radially outward from the hub 90. The excavating wheels 48 comprise a plurality of digging buckets 94 which are equally spaced circumferentially around the hub 90 and which extend between the rims 92. The digging buckets 94 each have a cutting edge 96 including a plurality of teeth 98, and a stationary front wall 100 extending generally radially inwardly from the cutting edge 96. Each digging bucket further includes a rear wall 102, which is supported for pivotal movement between a digging position and a dumping position. The rear walls 102 of the digging buckets 94 are actuated to the digging position when their respective digging buckets 94 are in the lower and forward position of their rotary motion and to the dumping position when their respective digging buckets 94 are in the upper and rearward portion of their rotary motion.

Referring to FIG. 8, the digging bucket actuating system comprises a plurality of push rods 112, each of which is connected between one of the rear walls 102 and a chain 114. The chain 114 is generally unconstrained but extends around a roller 116, which is supported on the shaft 88 and which is secured against angular movement relative to the shaft 88 by suitable brackets (not shown). As the digging wheels are rotated about the shaft 88, each push rod 112 comes into engagement with the roller 116 whereupon its respective rear wall 102 is pushed outwardly to the material dumping position. Subsequently, as each digging bucket is rotated to the lower and forward portion of its circular path, the chain 114 operates through the push rod 112 to positively return the rear wall 102 to the material digging position. This positive actuation of the rear wall 102 in both directions has been found to be vastly superior to the arrangement that has been used heretofore, wherein the rear portions of digging buckets were allowed to return to the digging position under the action of gravity.

Figures 10, 11:
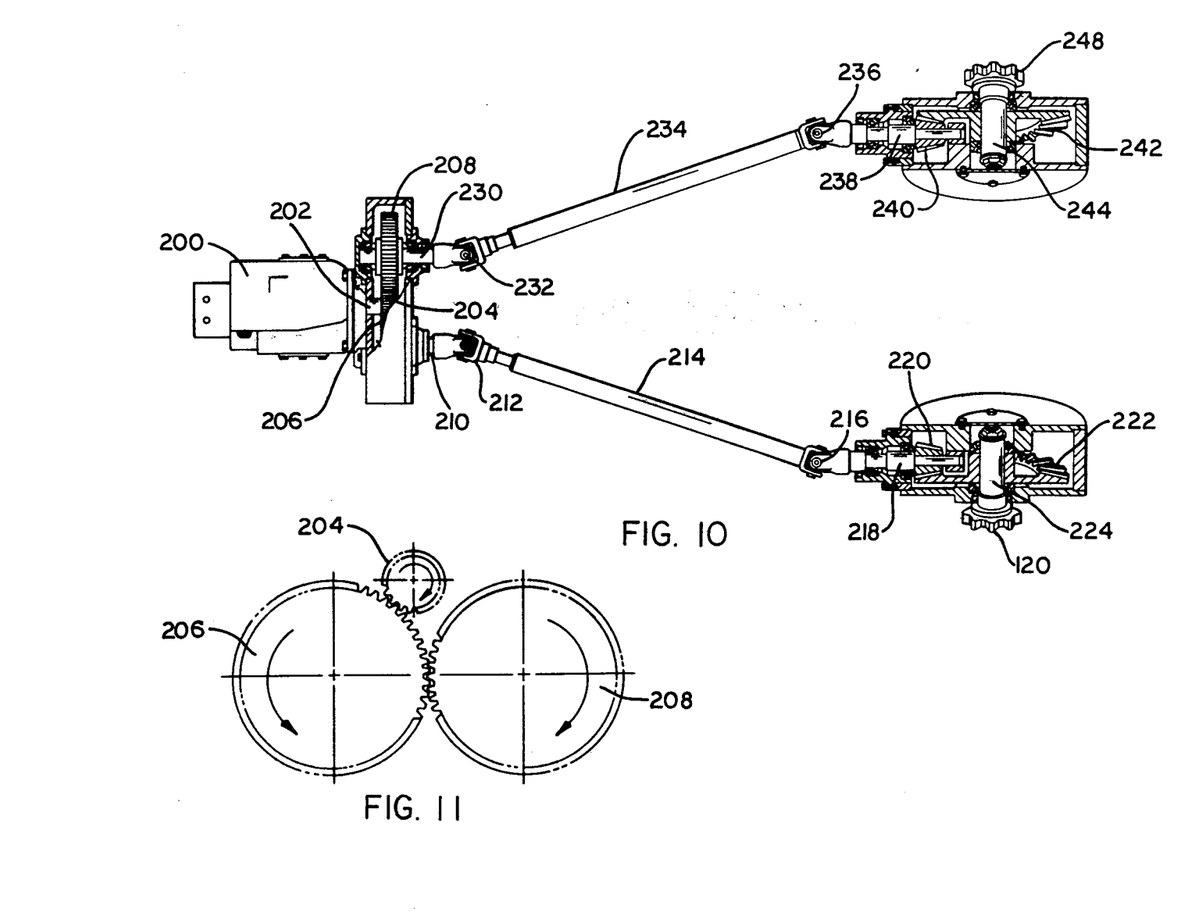
FIGS. 10 and 11 are illustrations of the drive system for the excavating wheels of the present invention.

Each excavating wheel 48 also includes a ring gear 118 and a pinion 120, which comprise part of the drive system for the excavating wheels 48. Referring to FIGS. 10 and 11, a hydraulic motor 200 is actuated utilizing pressurized hydraulic fluids supplied by the pumps 56 under the control of valves located within the operator's compartment 62. The motor 200 has an output shaft 202 which drives a pinion 204. The pinion 204 is mounted and meshed with drive gear 206, which is in turn mounted and meshed with a drive gear 208 which is equal in size and number of teeth to the drive gear 206.

The drive gear 206 has an output shaft 210 extending to a universal joint 212. The universal joint 212 drives a drive shaft 214, which extends to a universal joint 216. The universal joint 216 drives a drive shaft 218, which drives a bevel pinion 220. The pinion 220 is mounted in mesh with a bevel gear 222, which drives a shaft 224. Shaft 224 drives the pinion 120 which is shown in FIG. 9 and is mounted in mesh with the ring gear 118 mounted within the excavating wheel 48.

The drive gear 208 has an output shaft 230 extending to a universal joint 232. The universal joint 232 drives a drive shaft 234, which extends to a universal joint 236. The universal joint 236 drives a drive shaft 238, which drives a bevel pinion 240. The pinion 240 is mounted in mesh with a bevel gear 242 which drives a shaft 224. Shaft 244 drives a pinion 248 which is mounted in mesh with a ring gear corresponding to ring gear 118 mounted in the second excavating wheel 48.

Figure 12:
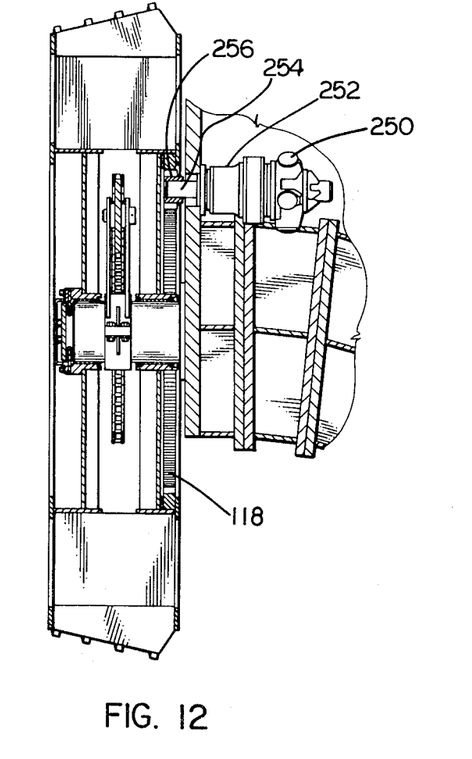
FIG. 12 is a sectional view of an excavating wheel comprising an alternative embodiment of the drive system.

An alternate system for driving the excavating wheels 48 is illustrated in FIG. 12. A hydraulic motor 250 drives a speed reducer 252 having an output shaft 254. A pinion 256 is mounted on the shaft 254 and is in turn mounted mesh with the ring gear 118 mounted within the excavating wheels 48. In this manner the hydraulic motor 250 operates through the speed reducer 252, the shaft 254 and pinion 256 to rotate the excavating wheel 48.

Figure 13:
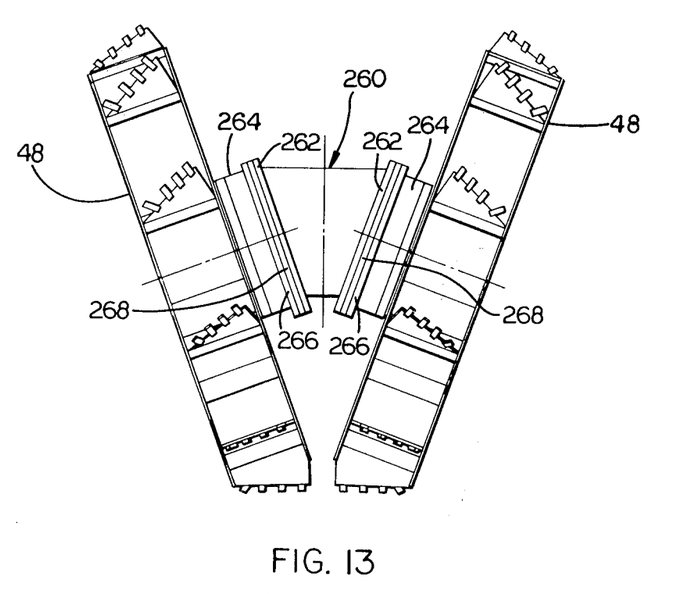
FIGS. 13, 14, and 15 illustrate various supporting structures for supporting the excavating wheels.

The use of the drive system illustrated in FIG. 12 is advantageous in that it facilitates adjustment of the relative positioning of the excavating wheels 48 to vary the configuration of the pipeline receiving trench that is formed thereby. The normal position of the excavating wheels 48 is illustrated in FIG. 13. A support structure 260 for the excavating wheels 48 is positioned therebetween and extends to a pair of flanges 262. Each of the excavating wheels 48 is mounted on a subsupport structure 264 extending to a flange 266. A small spacer 268 is illustrated as positioned between flanges 266 and 262. The space between the excavating wheels 48 may be reduced from that illustrated in FIG. 13 by removing the spacers 268 and securing the flanges 266 and 262 directly one to the other.

Figure 14:
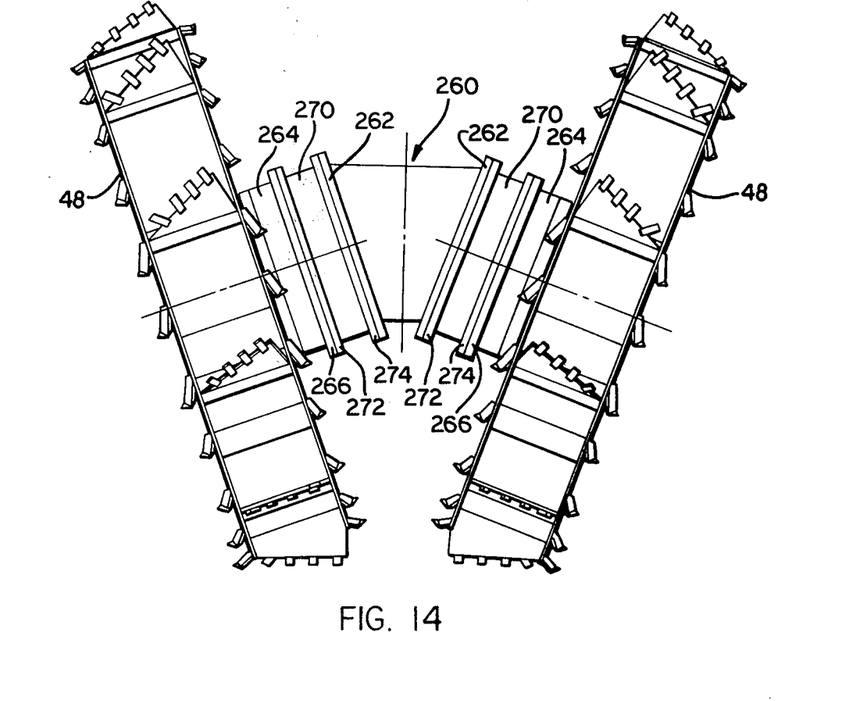
Figure 15:
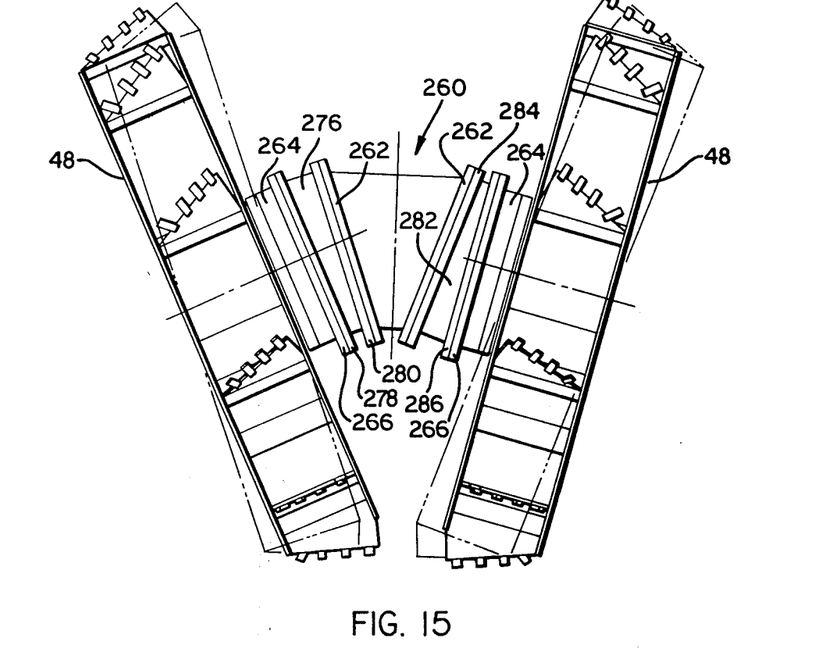

Referring to FIG. 14, the spacing between the excavating wheels 48 may be increased by positioning a relatively wide spacer 270, having flanges 272 and 274 betwween each set of flanges 262 and 266. Similarly, as shown in FIG. 15, the angular relationship between the excavating wheels 48 may be adjusted by positioning spacers having a particular angular configuration between each set of flanges 262 and 266. For example, a spacer 276, having flanges 278 and 280 and secured to flanges 262 and 266 may be utilized to orient the excavating wheels in a more nearly horizontal orientation. Alternatively, a spacer 282, having flanges 284 and 286 and secured to flanges 262 and 266 may be utilized to orient the excavating wheel 48 in a more nearly vertical orientation. It will be understood that other types and sizes of spacers may be utilized in order to position the excavating wheels 48 in accordance with the requirements of a particular application.

Referring again to FIGS. 3 and 4, the excavating machine 32 further includes a conveyor system 300 which functions to receive excavated material from the excavating wheels 48 and to convey the excavated material rearwardly and upwardly from the excavating wheels 48. It will be understood that as the angle of the inclination of conveyor system 300 approaches and exceeds 45°, it may be advantageous to use a cover or sandwich conveyor extending parallel to or above conveyor system 300 for the purpose of retaining excavated material and for engagement therewith. As is best shown in FIG. 5, the conveyor system 300 includes a pair of conveyor belts 302 mounted on opposite sides of the excavating machine 32. Each of the conveyor belts 302 functions to receive excavated material from one of the excavating wheels 48, and to convey the material rearwardly and upwardly from the excavating wheels 48. The material is then discharged to a hopper 304, which functions to direct the excavated material from both of the conveyor belts 302 through a central aperture 306. Hopper 304 is pivotally mounted to the conveyor system 300 for manipulation between the storage position when the excavating machine 32 is in the travel position illustrated in FIG. 3 and the operational position when the excavating machine 32 is in the machine work position illustrated in FIGS. 4 and 5.

The belts 302 are each driven by a hydraulic motor 308 which drives a speed reducer 310. The speed reducer 310 in turn drives a drive shaft 312, which extends to pulleys mounted at the upper ends of both of the conveyor belts 302. In this manner the hydraulic motor 308 functions through the speed reducer 310 in the shaft 312 to drive both the conveyor belts 302.

Figure 4:
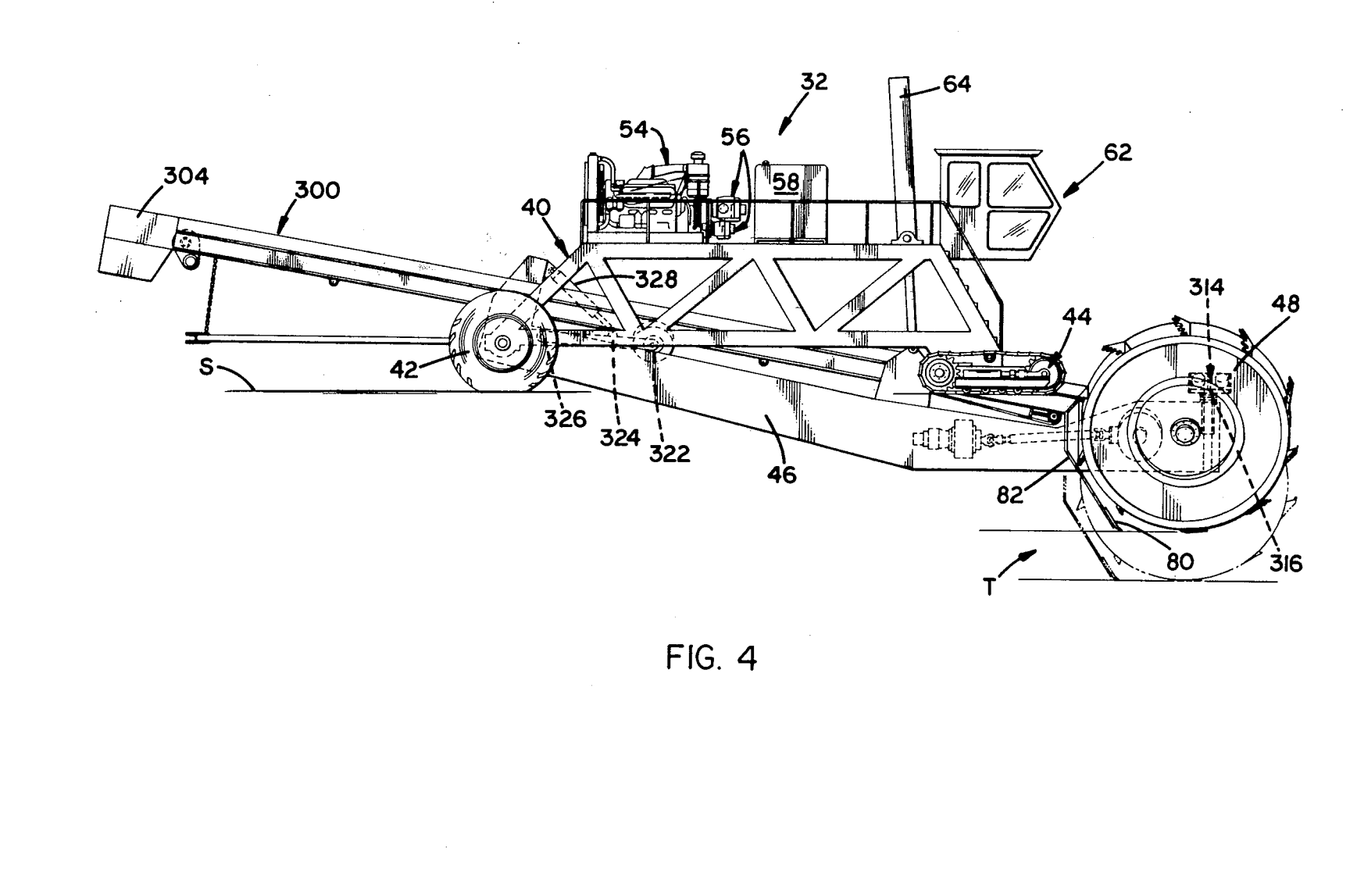

Referring to FIGS. 4, 5 and 6, the excavating machine 32 further includes structure for guiding a pipe, such as the pipe P illustrated in FIG. 5, into the pipeline receiving trench T formed by the excavating wheels 48. A pipe bolster assembly 314 is mounted on the wheel frame 46 for vertical movement thereby under the action of the hydraulic cylinders 64. The positioning of the bolster assembly 314 relative to the wheel frame 46 is regulated by means of a plurality of spacers 316. As best shown in FIG. 4, the spacers 316 are selectively positioned between the bolster assembly 314 and the wheel frame 46. As is best shown in FIGS. 5 and 6, the bolster assembly 314 comprises a plurality of rollers 320 which function to support the pipe P for longitudinal movement thereover.

Referring to FIGS. 4 and 5, a pair of pipe rollers 322 are rotatably supported on a subframe 324 mounted for pivotal movement about a horizontal axis defined by a pair of pivotal pins 326. The positioning of the rollers 322 is controlled by a pair of hydraulic cylinders 328 connected between the subframe 324 and the main frame 40. As is most clearly illustrated in FIGS. 5 and 6, the rollers 322 function to engage the pipe P after the pipe P is passed over the pipe bolster assembly 314, and serves to force the pipe into the pipeline receiving trench T formed by the excavating wheels 48.

In operation of the pipeline installation system 30, a plurality of pipe sections are joined to form a pipeline string. The pipeline string is positioned on the surface S over the location that the pipeline string is desired to be installed. The excavating and pipeline installation system 30 will then be maneuvered towards the end of the pipeline string, such that the excavating wheels 48 are centered about the longitudinal axis of the pipeline string. The excavating wheels 48 under the control of the hydraulic cylinders 64 will then be lowered from the travel position to the work position and begin excavating of the pipeline receiving trench T. When the desired trench depth and length are reached, the excavating machine 32 will begin excavation of material from beneath the pipeline string. The pipe bolster assembly 314, having been previously adjusted for the particular depth of the trench, will then engage the end of the pipeline string. The pipeline string will therefore be received by the bolster assembly and will be positioned between the excavating wheels 48.

As the excavating machine 32 continues to move forward removing material from beneath the pipeline string, the main frame 40 will be positioned above the pipeline string, the pipe having rolled over the bolster rollers 320. The pipe rollers 322 will then engage the pipeline string and exert a downward directed force upon the pipeline thereby positioning the pipeline string into the trench T. Simultaneously with the excavation and positioning of the pipeline string within the trench, the excavated material will be deposited by the excavating wheel digging buckets 94 onto the conveyors 302 for transfer rearwardly of the excavating wheels 48 to the hopper 304. The excavated material may then be redeposited through the hopper aperture 306 into the trench to cover the pipeline string positioned therein.

Figures 16, 17:
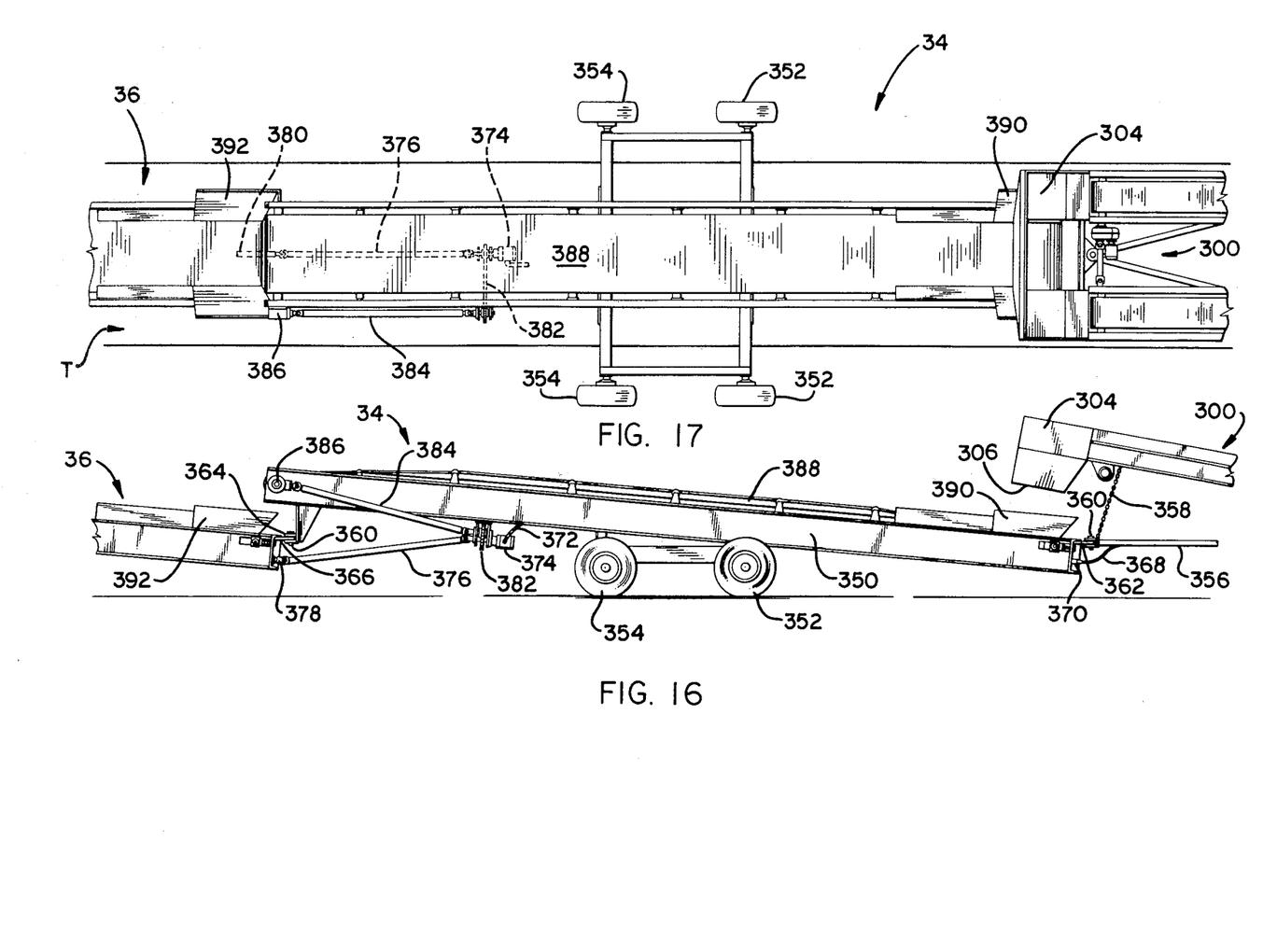
FIGS. 16 and 17 are a side elevation view and a top plan view respectively, of the detachable trailers of the preferred embodiment of the present invention.

Referring to FIGS. 1 and 2, the pipeline installation system 30 further includes a plurality of trailers 34, 36, 38 etc. One such trailer 34, is shown in FIGS. 16 and 17. Each of the trailers comprises a frame 350 supported on a plurality of wheels 352 and 354. The plurality of wheels 352 and 354 are centrally disposed about the center of the trailer frame 350 to enable the plurality of trailers to move about a curved path formed by the trench T as shown in FIG. 2. The central location of the wheels 352 and 354 allows the ends of the plurality of trailers to move outwardly relative to the arc created by the curved pipeline trench. The ends of the trailer, therefore, are relatively free to move unrestricted of the central portion of the trailer. The distance between wheels 354 supporting trailer 34 and the frontmost pair of wheels supporting trailer 36 is approximately the length of each trailer.

The excavating machine 32 includes a tow bar 356, which is supported from the conveyor assembly 300 by a chain 358 or other suitable support. A pin 360 connects the tow bar 356 to corresponding hitching structure 362 on the trailer 34. Similar pins 360 are utilized to connect hitching structure 364 at the end of the trailers 34, 36, etc. to the corresponding hitching structures 366 at the front of the trailer positioned next rearwardly.

A conduit 368 supplies a pressurized hydraulic fluid to the trailer 34 through a quick disconnect coupling 370. A conduit 372 extends from the coupling 370 to a hydraulic motor 374, which in turn drives a drive shaft 376. The drive shaft 376 extends through an agricultural type coupler 378, which functions to connect the shaft 376 to an equivalent drive shaft 380 on the trailer positioned next rearwardly. In this manner the hydraulic motor 374 supplies operating power for all of the trailers 34, 36, 38, etc.

The hydraulic motor 374 also operates through a drive chain 382 to drive a drive shaft 384. The drive shaft 384 extends to a right angle drive 386, which in turn drives a conveyor pulley on the trailer 34. The conveyor pulley drives a conveyor belt 388 which extends the entire length of the trailer 34. To facilitate transportation of the excavated material by the conveyor belt 388, the receiving front end of the trailer is lower than the discharge rear end of the trailer. The conveyor belt 388 functions to transport excavated material received in a hopper 390 at the front end of the trailer 34 rearwardly and to discharge the material into an equivalent hopper 392 mounted at the front of the trailer positioned next rearwardly. The hopper 390 in turn receives the excavated material from the hopper 304 positioned at the rear end of the excavating machine 32 through the central aperture 306 thereof. The excavated material may be transported rearwardly from the excavating machine 32 to be redeposited over the pipeline positioned within the trench or may be discharged to a transporting vehicle for removal from the excavation site.

Figure 18:
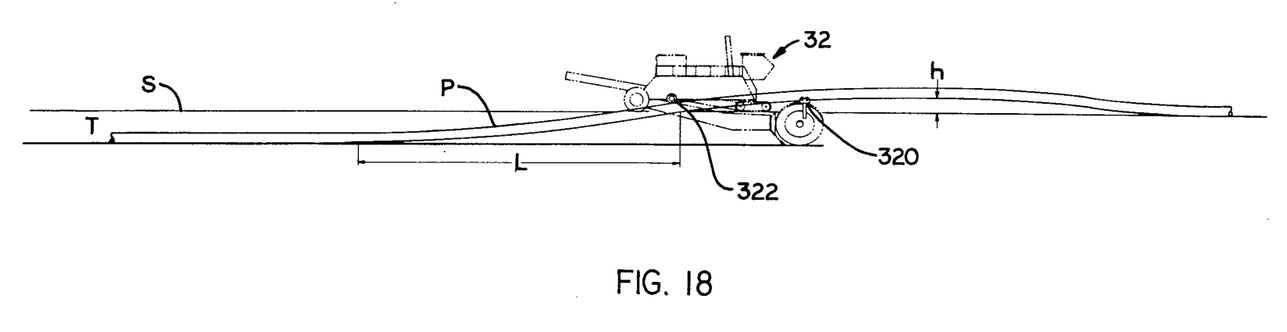
Figure 19:
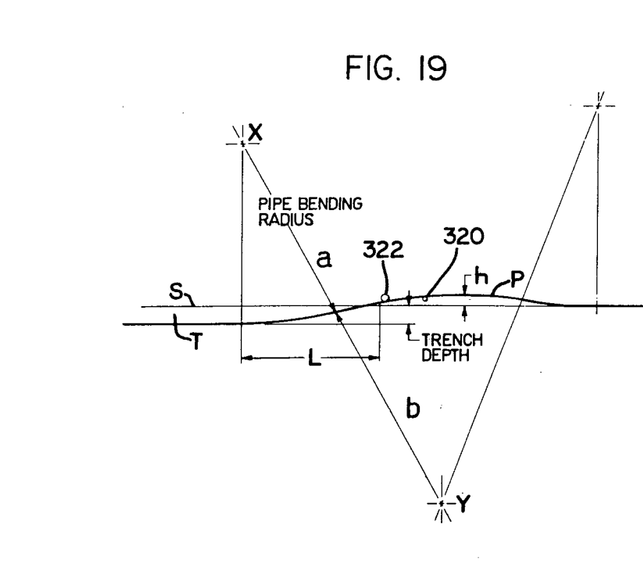

The number of trailers needed to transport the excavated material rearwardly in order to cover the pipeline after it has been positioned on the bottom of the trench T, and the length of the trench that must be excavated before the excavating wheels begin excavation of material from beneath the pipeline is dependent upon the pipe diameter and also the height at which the pipeline string is received by the bolster assembly 314. As illustrated in FIG. 18, the variable h is the distance between the surface S and the pipeline, measured at a point in advance of the excavating machine 32. FIG. 19 represents the geometric construction necessary to determine the variable L which is the distance from the pipe rollers 322 to a point at which the pipeline string is fully seated on the bottom of the pipeline trench T.

FIG. 19 represents the geometric construction necessary for a thin walled pipe having a bend radius not exceeding 500 times the pipe diameter. The radius a and radius b are generated from points x and y respectively using standard geometric formula known in the art. The point at which radius a is tangent to the bottom of the trench T determines the length L, and the point at which radius b reverses itself determines the height h.

Figure 20:
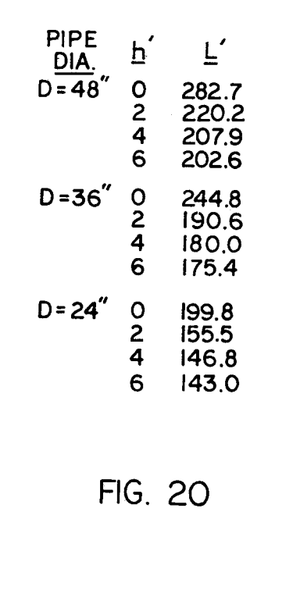
FIG. 20 is a tabulation of data, all relating to a particular feature of the invention.

As the height of the bolster rollers 320 increases, thereby increasing h, there is an increased downwardly directed load imparted to the pipeline by the pipe rollers 322. This downwardly directed load increases the bending of the pipeline and increases the moment on the pipeline about the bolster rollers 320. This moment causes the pipeline to be raised in advance of the excavating machine 32 to a maximum height h as shown in FIGS. 18 and 19. The raising of the pipeline in turn reduces the distance L that is required to fully seat the pipeline in the trench T, and thereby reduces both the distance that the excavated material must be conveyed and the number of trailers 34, 36, 38 etc. required in the pipeline installation system 30. The relation between the height h to which the pipeline is raised and the reduction in the distance L is shown in the table of FIG. 20. For example, if a 48 inch diameter pipe is being installed and if the pipeline string is lying on the surface S when received by the bolster assembly, h equals zero and the distance L is 282.7 feet. However, if the pipeline string is raised to a height of 6 feet above the surface S in advance of the excavating machine, the length L required to seat the pipeline in the trench T is reduced to 202.6 feet. Similarly, the values for h and L are listed in FIG. 20 for pipe diameters of 36 inches and 24 inches.

From the foregoing it will be understood that the present invention comprises an excavating and pipeline installation system including an excavating vehicle and a plurality of trailers. An excavating wheel assembly is mounted at one end of the vehicle, such that a pipeline string can be positioned between the excavating wheels to permit excavation of material from beneath the pipeline string. A conveyor system is also mounted on the vehicle to transport excavated material rearwardly from the excavating wheels to be redeposited over the installed pipe. The use of the invention is advantageous over prior art systems because the pipeline can be positioned over a predetermined location and the trench formed directly beneath the positioned pipe. The system eliminates the need for digging a pipeline trench and then using other equipment such as cranes or the like to lift the pipe into the pipeline trench. Furthermore, the system permits the continuous refilling of the pipeline trench with the material that has been previously excavated.

More specifically, one of the major advantages in the use of the present invention permits the installation of a pipeline where only a narrow right-of-way is available. The minimum width of a right-of-way is determined by the width of the excavating vehicle, and no additional space is required for storing excavated material as is required by existing systems.

Although preferred embodiments of the invention have been illustrated in the Drawings, and described in the foregoing specification, it will be understood that the invention is not limited to the embodiments disclosed, but is capable of rearrangement, modification and substitution of parts and elements without departing from the spirit of the invention.

What is claimed is:

1. In an excavating and pipeline installation system, apparatus for receiving a pipeline strung along a predetermined course and for installing the pipeline in a pipeline receiving trench extending at a predetermined depth beneath the predetermined course including:
    a vehicle adapted for movement over the surface of the earth;
    excavating means mounted on the vehicle for continuously forming the pipeline receiving trench;
    a pipeline bolster mounted on the vehicle a predetermined distance above the predetermined course for receiving and supporting the pipeline; and
    at least one pipeline roller mounted on the vehicle for receiving the pipeline from the pipeline bolster and for exerting a downward force on the pipeline;
    said excavating means comprising first and second excavating wheels mounted for rotation about angularly disposed axes and for engagement with material to be excavated, the pipeline bolster being positioned between the upper portions of the first and second excavating wheels;
    said pipeline bolster and said pipeline roller applying a moment to the pipeline whereby the pipeline is initially lifted a predetermined distance above the predetermined course which is in excess of the distance that the pipeline bolster is positioned above the predetermined course and thereby substantially reducing the distance that is required in order to fully seat the pipeline in the pipeline receiving trench.

2. The excavating and pipeline installation system of claim 1 further including:
    means for selectively varying the position of the pipeline bolster above the predetermined course for receiving the pipeline; and
    hydraulic cylinder means for applying a predetermined force to the pipe roller.

3. The excavating and pipeline installation system of claim 2 further including:
    means for selectively varying the angular displacement between the first and second excavating wheels, thereby varying the width and slope of the side walls of the pipeline receiving trench.

4. The excavating and pipeline installation system of claim 3 further including:
    conveyor means for receiving excavated material from the first and second excavating wheels, for transporting the excavated material rearwardly of the excavating wheels and for redepositing the excavated material within the pipeline receiving trench on top of the pipeline after full seating thereof in the pipeline receiving trench.

5. The excavating and pipeline installation system of claim 4 wherein the conveyor means comprises:
    a first conveyor means for receiving the excavated material from the first excavating wheel; and
    a second conveyor means for receiving the excavated material from the second excavating wheel, such that the first and second conveyor means extend along opposite sides of the vehicle.

6. The excavating and pipeline installation system of claim 4 further including:
    a plurality of detachable trailers for connection to the rear of the vehicle; and
    conveyor means mounted on each one of the plurality of trailers, wherein each trailer receives the excavated material from the previous trailer for transporting the excavated material to the rear of the vehicle and rear of the trailers.

7. The excavating and pipeline installation system of claim 6 wherein each of the plurality of trailers further includes:
    a frame; and
    means for supporting the frame to enable movement of the plurality of trailers around a curved path.

8. An excavating and pipeline installation system comprising:
    a vehicle adapted for movement over a surface;
    excavating means mounted on the vehicle for forming a pipeline receiving trench to a predetermined depth beneath the surface;
    conveyor means for receiving excavated material from the excavating means and for conveying the excavated material in the opposite direction from the direction of movement of the vehicle and for redepositing the excavated material in the pipeline receiving trench following the seating of a pipeline therein;
    pipeline bolster means mounted on the vehicle a predetermined distance above the surface for receiving and supporting a pipeline;
    pipeline roller means mounted on the vehicle for receiving the pipeline from the pipeline bolster means and for exerting a downward force on the pipeline;
    said excavating means comprising first and second excavating wheels mounted for rotation about angularly disposed axes and for engagement with material to be excavated, the pipeline bolster being positioned between the upper portions of the first and second excavating wheels;
    said pipeline bolster means and said pipeline roller means applying a moment to the pipeline whereby the pipeline is initially lifted above the surface to an extent greater than the positioning of the pipeline bolster means thereabove and the distance required to fully seat the pipeline in the pipeline receiving trench is correspondingly reduced; and whereby the distance that the excavated material must be conveyed from the excavating means for redepositing in the pipeline receiving trench on top of the fully seated pipeline therein is substantially reduced.

9. The excavating and pipeline installation system of claim 8 further including:

means for selectively varying the position of the pipeline bolster means above the surface for receiving the pipeline; and means included in the pipeline roller means for applying a predetermined downwardly directed force to the pipeline.

10. The excavating and pipeline installation system of claim 9 wherein the vehicle includes:

a subframe selectively pivotable between a working and traveling position, the first and second excavating wheels and at least a portion of the conveyor means being mounted to the subframe.

11. The excavating and pipeline installation system of claim 10 wherein a portion of the conveyor means comprises:

a plurality of trailers each having a conveyor means mounted thereon, the conveyor of each trailer being adapted to receive excavated material from the preceding trailer and to transport the excavated materials in the direction opposite to the direction of movement of the vehicle.

12. The excavating and pipeline installation system of claim 11 wherein each of the plurality of trailers further includes:

support means positioned relative to the overall length of the trailer to facilitate movement of the plurality of trailers around a curved path.

13. The excavating and pipeline installation system of claim 12 further including:

means to facilitate positioning of the first and second excavating wheels in various spaced apart relationships and in various angular relationships with respect to one another.

14. The excavating and pipeline installation system of claim 13 wherein the conveyor means mounted to the subframe extends along opposite sides of the vehicle to facilitate the receiving of the pipeline between the first and second excavating wheels and between the conveyor means.

* * * * *